Dec. 5, 1967    W. G. MITCHELL    3,356,111
POWER TOOL IMPROVEMENTS
Original Filed Oct. 31, 1961    6 Sheets-Sheet 2

INVENTOR
WALTER G. MITCHELL

BY Strauch, Nolan, Neale, Nies & Kurz
ATTORNEYS

Fig. 7

INVENTOR
Walter G. Mitchell

INVENTOR
Walter G. Mitchell

BY Strauch, Nolan, Neale, Nies & Kurz
ATTORNEYS

INVENTOR
Walter G. Mitchell

BY *Strauch, Nolan, Neale, Nies & Kurz*
ATTORNEYS

Dec. 5, 1967 W. G. MITCHELL 3,356,111
POWER TOOL IMPROVEMENTS
Original Filed Oct. 31, 1961 6 Sheets-Sheet 6

INVENTOR
Walter G. Mitchell

BY *Strauch, Nolan, Neale, Nies & Kurz*
ATTORNEYS

United States Patent Office 3,356,111
Patented Dec. 5, 1967

3,356,111
POWER TOOL IMPROVEMENTS
Walter G. Mitchell, Pitcairn, Pa., assignor to Rockwell Manufacturing Company, Pittsburgh, Pa., a corporation of Pennsylvania
Original application Oct. 31, 1961, Ser. No. 149,002. Divided and this application Apr. 6, 1965, Ser. No. 451,089
17 Claims. (Cl. 143—36)

ABSTRACT OF THE DISCLOSURE

The power driven, tilting arbor saw disclosed herein is provided with a casingless motor having end bells which directly mount the motor on a tilt bracket. The end bells and motor stator terminate in a chordal plane to form a flat side extending from one end of the motor to the other and seating against the underside of the saw table.

---

The present invention relates to power tool improvements and more particularly to improvements in bench or table supported power tools which make it possible to reduce the size and weight of such power tools and their parts with incident simplification of the over-all construction of such tools and marked savings in materials and manufacturing expense while at the same time assuring at least the same or greater work handling capacity of the larger and heavier power tools now generally offered on the market.

This is a division of copending application Ser. No. 149,002, filed Oct. 31, 1961 for Power Tool Improvements.

As will be apparent from a consideration of typical power tool structures illustrated in United States Letters Patent 2,346,198 of Herbert E. Tautz, issued Apr. 1, 1944, 2,360,921 of C. A. Wiken, issued Oct. 24, 1944, 2,567,987 of C. A. Wiken issued Sept. 18, 1951 all directed to drill press structures; further consideration of United States Letters Patent 2,265,406 and 2,265,407 of Herbert E. Tautz, issued Dec. 9, 1941 both directed to circular saw structures; and still further consideration of United States Letters Patent 2,758,617 of W. S. Taylor, issued Apr. 14, 1946 and entitled Jointer, it has been the general commercial practice in the power tool art to provide power tools with heavy standard encased motors and to utilize cast iron or other heavy support structure and work table structures requiring expensive machining operations to provide the necessary accuracy for journals, pads, lands and slide ways need for the mounting of the motors, cutter arbors and control mechanism. As a consequence, the prior art bench and table tools embody massive metal support and work table structures to house and support the large heavy motors and necessitate an inordinate amount of machining, out sized cutter structures of highly expensive tool steel, special high cost bearings and expensive special lubrication because of the resulting motor, arbor bearing and cutter heat.

It is a primary object of this invention to avoid the massive structures of the prior art and overcome the heat dissipation problems by providing power tool structures employing a casingless motor and combination motor and operating mechanism housings, support parts and shafting and other mechanism parts made up of die castings of high heat conducting material designed to cooperate with the housingless motor structure and die cast high heat conductive motor rotor and fan structure and end bells to dissipate the motor, arbor bearing and cutter heat and eliminate major machining operations thereby assuring greatly reduced tool sizes, major savings of table and housing material and an over-all reduction of manufacturing, packaging and shipping expense. To accomplish this size reduction and weight and material saving while providing a motor having adequate horsepower to enable the resulting machine tools to assure the same workpiece handling capacity poses a major problem in heat dissipation as the art has long appreciated, see United States Letters Patent 1,977,061 to J. G. Hey, issued Oct. 16, 1934 and 2,700,115 of J. R. Mowery, Jr., issued Jan. 18, 1955 which are novelly met in this invention by utilizing light weight, high heat conductive metal parts and designing the control mechanisms and support elements to relieve them of abnormal strains in use that might fracture such parts.

Another important object of the present invention is to provide a casingless electric motor having die cast end bells providing accurately related motor shaft bearing seats and pivot mounts in the form of stout strain and stress resisting pivot arms.

It is a further object of the present invention to provide a circular saw structure comprising a die cast metal work support table formed with the required reinforcing ribbing, miter gauge grooving, table blade opening and motor and operating mechanism bracket pads; a die cast tilt bracket and bracket support for supporting, aligning and mounting motor and operating parts, and die cast motor end bells directly mounting the motor on the tilt bracket to reduce the over-all weight and assure rapid dissipation of the generated heat so that expense may be minimized.

Another object of the present invention is to provide a circular saw structure in accord with the preceding object with a simple tilt bracket pivot mount located closely adjacent the undersurface of the table, a casingless motor in which the stator and motor end bells terminate along a chordal plane to form an axially continuous flat side from end to end of the motor at a minimum radial distance from the axis of the motor shaft and motor end bells having supporting pivot arms arranged with respect to the flat sides to assure abutment of the flat side with the table undersurface to assure a direct heat conduction path from the motor stator and end bells to the table itself and a minimal linear distance between the rotor and axis and work support surface of the table to expose a greater portion of that annular area of the saw blade nearest the rotational axis above the work support surface enabling a saw blade of reduced diameter to be employed to provide a more effective application of available motor power to the cutting teeth in handling given work capacity thereby saving saw blade material, and enabling a dimensional reduction of the table and support parts with incident material and machining savings.

Another object of the present invention is to provide a circular saw in which the operating mechanism support parts are made up of die cast, light weight, high heat conductive metal with hand wheel driven tilt screw and elevating screw mechanisms having limit stops designed to prevent the light weight parts from being overstressed by overtravel of such hand wheel driven screw mechanisms.

A still further object of the present invention is to provide a tilting arbor table saw with (a) a die cast tilt bracket of general L-shaped configuration having a main body portion formed along its top edge with spaced pivot ears for suspending the tilt bracket from a saw table pivot close to the saw table under surface and an end wall providing at a level offset below the pivot ears a pair of pivot support ears mounting a depth of cut pivot with its axis at right angles to the saw table pivot and (b) a motor having a combined rotor and saw blade arbor shaft and die cast end bells fixed to the stator and adapted to journal the combined rotor and saw blade arbor shaft and provide respective radially directed mounting arms terminating in pivot journal bosses for directly pivotally mounting the motor for swing movement toward and away from the table around the depth of cut pivot.

Still another object of the present invention is to provide one of the end bells of the preceding object with a web structure extending between the lower edge of its mounting arm and the end bell end wall and extending outwardly beyond the mounting arm to terminate in an arcuate flanged portion having the axis of the depth of cut pivot as a center and forming a clamp surface engageable by a clamp mechanism supported and oriented by an ear formed on the main body of the tilt bracket to clamp the motor in selected depth of cut positions.

Another object of the present invention is to provide the end bell of the previous object with a second arm angularly offset from its mounting arm and terminating in an apertured journal boss journalling a block having a through tapped opening to threadedly receive an elevator screw shaft threadedly supported by a similar block journalled in a journal bore suitably positioned on the main body of the tilt bracket.

Another object of the present invention resides in extending the clamp mechanism called for in a previous object axially beyond its supporting ear and through an arcuate slot formed in a further table supported bracket fixed to the table and extending at right angles adjacent the other end of the main body of the tilt bracket adapting it to also cooperate with the further table supported bracket and provide a clamp mechanism for clamping the tilt bracket in a selected position.

A further object of the present invention resides in providing a tilting arbor saw having a motor structure including end bell support arms directly mounting the motor on a tilt bracket to form an elevating adjustment with a combined splitter plate and blade guard support independently journalled on the stationary table for tilting movement around a pivot disposed close to the table under surface and rearwardly of the table blade opening with its axis in the vertical plane of and coaxial to the tilt bracket pivot and its splitter body in the plane of the saw blade carried by the motor shaft adjacent one end bell in laterally centered relation to the blade opening side walls and having an offset portion disposed to engage in a slot formation of said one end bell and be tilted as the motor, motor shaft and blade tilt.

A still further object of the present invention resides in providing a jointer with adjustable cutter head journal brackets.

Further objects will appear from the following description and appended claims when read in conjunction with the accompanying drawings wherein:

FIGURE 15 is a view, to an enlarged scale, of a control nut employed on the saw;

FIGURE 16 is a perspective view of the saw blade and splitter; and

In carrying out the foregoing objects, the present invention generally contemplates a major reduction (about thirty percent [30%]) in the size, weight and metal requirements for the given capacity of power driven machine tools of the type which are commonly employed in conventional home or cabinet workshops in order to realize an appreciable conservation of floor space, of work support table and tool housing material, and machining operations and incident expense, thus providing for a significant savings in material, shipping and overall cost of manufacture and assuring a retail selling price of a full capacity machine tool within the means of the home owners or small workshop owners under our present day economy. The present invention is illustrated herein as applied to a circular saw 48 with the reduction in size and weight. This tool may be easily shifted from one location to another in the workshop thus readily affording a great flexibility in workshop floor plan arrangements to meet assorted and varied conditions and space limitations.

In general, the major reduction in size, material and weight of the foregoing machine tool is accomplished in according with the present invention by a unique manner of dissipating the motor heat generated in operation of such tools by means of a combined utilization of heat conducting housings and channeling of fluid coolant through novel housing and parts construction and a novel casingless electric motor which is indicated by the reference character 50 and which is constructed and arranged to cooperate with the heat conducting housings to be presently described for more rapidly effecting the dissipation of heat attributable to the operation of the motor and also the bearing and like heat generated by operation of the machine tool arbor, thus permitting, among other features, the employment of less expensive bearing structures to obtain equal bearing efficiency and life. The specific application of this heat dissipation as applied in each of the tools mentioned will be hereinafter developed.

With the novel heat conducting housings, channeling of fluid coolant and casingless motor, a motor output efficiency (horsepower) is maintained and a developed horsepower is effectively utilized which heretofore was obtainable only by utilization of larger conventional sized casing type motors previously found necessary to drive the machine tool of the type illustrated herein.

THE MOTOR

As best shown in FIGURES 1–5, motor 50 is of the alternating current type and comprises a stator 52, and a rotor 54 surrounded by stator 52 and appropriately non-rotatably mounted on an arbor shaft 56 which is rotatably supported in end bells 58 and 60 spaced axially apart at opposite ends of rotor 54. In accordance with the present invention, end bells 58 and 60 each are formed as an integral die cast structure of lightweight high heat conductive metal such as aluminum or aluminum alloy. Stator 52 includes the usual winding 62 and a laminated core 64 which has a special configuration as will be presently described. As shown in FIGURE 21, winding 62 extends axially beyond core 64 at opposite ends thereof.

Figures 1, 1A, 1B, 4, 5:
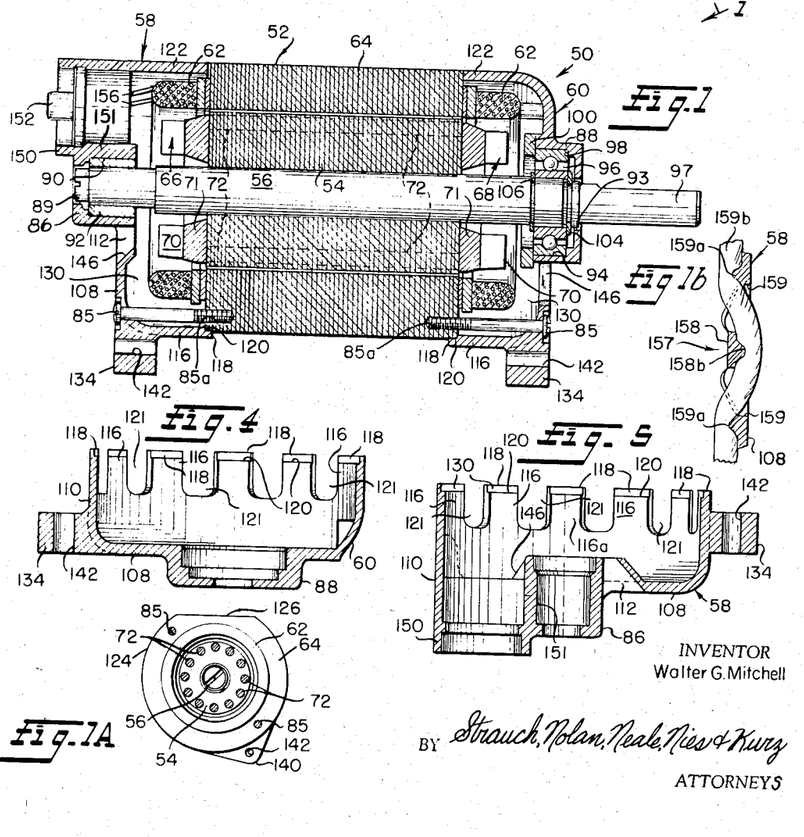
FIGURE 1 is a longitudinal sectional view through the motor of the present invention taken substantially along the line 1—1 of FIGURE 2.
FIGURE 1a is a left-hand end view of the motor illustrated in FIGURE 1 with the left-hand motor end ball, fan, and current shorting rings removed to show the configuration of the motor stator.
FIGURE 1b is a fragmentary view illustrating the support of the power input cord upon the end bell shown in FIGURE 3.
FIGURE 4 is a sectional view through the end bell illustrated in FIGURE 2.
FIGURE 5 is a sectional view through the end bell illustrated in FIGURE 3.

With continued reference to FIGURE 1, shaft 56, which is solid, carries two identically constructed centrifugal air ventilating fans 66 and 68 having straight blades generally indicated by the reference character 70 formed as an integral extension of the customary current shorting rings 71 interconnected through the rotor laminations by rods or current bars 72 integrally cast with the rings. The blades 70 of each of the fans 66 and 68 extend radially and axially outward from one side of rings 71. As shown, blades 70 of fan 66 are radially encircled by the portion of stator winding 62 extending axially beyond the left-hand end face of core 64. Fan 68, facing oppositely from fan 66, has its blades 70 radially encircled by the portion of stator winding 62 extending axially beyond the right-hand end face of core 64 in the same manner as fan 66. Shaft 56 is press fitted into the rotor laminations and the rotor 54 is completed by integrally die casting the rings 71, rods 72 and fan blades of lightweight high heat conductive material, such as aluminum or aluminum alloy, thereon.

End bells 58 and 60 are respectively fixedly secured by cap screws indicated at 85 screw threaded into blind tapped bores 85a formed axially inwardly of the annular end faces of stator core 64 which has its individual laminations seam welded together. As a result of welding the laminations of stator core 64 together, the necessity of providing for the conventional form of screw bolts extending completely through the stator to secure the stator and end bells together as a unit is eliminated.

With continuing reference to FIGURE 1, end bells 58 and 60 respectively are formed with inner apertured center bosses 86 and 88 aligning with the rotational axis of shaft 56. Boss 86 is provided with a stepped shaft bore 89 having a smooth cylindrical bearing seat 90 spaced radially apart from shaft 56 to form an annular well for reception of a sleeve bearing 92 made of bronze or other suitable bearing material. Sleeve bearing 92 is axially retained with a press fit on bearing seat 90. Similarly, boss 88 is formed with a stepped shaft bore 93 having a smooth cylindrical bearing seat 94 spaced radially apart from shaft 56 to form an annular well for reception of a ball bearing assembly 96 of conventional form. The ends of shaft 56 protruding axially beyond rotor 54 are journalled in bearing 92 and bearing assembly 96. The right-hand end of shaft 56 (as viewed from FIGURE 1) projects freely through boss 88 and has an extension end 97 extending outwardly beyond end bell 60 for connection with a driven element associated with the machine tools illustrated herein in a manner as will be presently described in detail.

Figure 2:
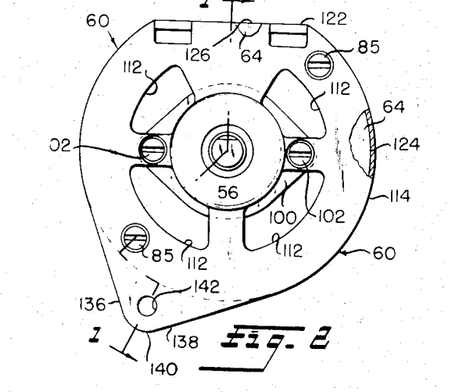
FIGURE 2 is a view of the motor of FIGURE 1 as viewed from the right end of FIGURE 1.

The outer race of bearing assembly 96 is axially confined in abutment with a radially extending shoulder 98 formed on boss 88 by means of a ring 100 acting axially against the outer race of assembly 96 and fixedly secured to end bell 60 as by screws indicated at 102 in FIGURES 1 and 2. The inner race of bearing assembly 96 is axially confined in place between two axially spaced apart split retainer rings 104 and 106 acting against opposite faces of the bearing assembly inner race and seated respectively in peripheral grooves formed in the periphery of shaft 56. By this bearing retaining structure, it will be appreciated that shaft 56 is held axially in place relative to end bells 58 and 60 and stator 52.

The end bells 58 and 60 illustrated in FIGURES 1-5 are constructed for incorporation into the motor powered bench drill 47 and also for jointer 49. A somewhat modified form of the motor end bells to be later described is incorporated into the circular saw 48.

Thus, with continuing reference to FIGURES 1, 2 and 4 end bell 58 is provided with a radial end wall segment 108 extending perpendicularly with respect to the longitudinal axis of shaft 56 and a skirt 110 extending axially inwardly from end wall segment 108. End wall segment 108 is provided with a circumferential row of axially extending air ventilating openings 112 formed closely around boss 86 and axially aligning with blades 70 of fan 66.

As best shown in FIGURE 5, skirt 110 has a continuous segment 114 (FIGURE 2) of generally circular configuration which is castellated to provide axially inwardly directed circumferentially spaced apart arcuate legs 116 (FIGURES 1 and 4) along a uniform radius taken from the center of boss 86 which aligns with the longitudinal axis of shaft 56. The inwardly directed ends of legs 116 are formed with arcuately shaped lips 118 which snugly interfittingly engage the outer smooth cylindrical periphery of stator core 64 and which form semi-annular radially extending shoulders 120 on legs 116. Shoulders 120 are contained in a common plane extending perpendicularly to the axis of shaft 56 and snugly abut the left-hand flat annularly shaped end face of stator core 64 as viewed from FIGURE 1. By this end bell and stator structure, radially extending circumferentially spaced apart air ventilating openings 121 are formed between legs 116 as best shown in FIGURE 5.

As best shown in FIGURE 2, the terminal ends of skirt segment 114 are joined by a flat sided imperforate chordal segment 122 having a straight axially inwardly directed edge 124 substantially contained in the plane passing through shoulders 120 and peripherally abutting the left-hand end face of stator core 64 as viewed from FIGURE 1. Stator core 64, as best seen from FIGURES 1, 1a and 2, is provided with a cross-sectional configuration which is essentially the same as that of end bell skirt 110.

As shown in FIGURE 1a, core 64 is formed with a chordal flat 126 interrupting its generally cylindrical exterior surface 124 which has a uniform radius of curvature substantially equal to the radius of curvature of the radially inwardly directed surfaces of lips 118. The purpose for the foregoing flat segmental chordal core and end bell surfaces will be presently described.

As shown in FIGURE 1, boss 86 extends axially beyond the inner and outer wall surfaces of end wall segment 108 with the greater portion of boss 86 extending outwardly beyond segment 108. This portion of boss 86 extending outwardly beyond segment 108 contains bearing sleeve 92 thus positioning bearing sleeve 92 and that portion of boss 86 containing sleeve 92 in the direct path of incoming air being axially drawn toward air inlet openings 112 which closely encircle boss 86 to assure an intimate wiping of cool air over the exterior cylindrical surface of boss 86 for removing the bearing heat.

End bell 58 is integrally formed with a hollow conically shaped inlet air baffle 146 extending axially inwardly from end wall segment 108 adjacent the radially outermost edges of air inlet openings 112. Baffle 146 is in surrounding spaced apart relationship to the portion of boss 86 projecting axially inwardly from end wall segment 108 and converges in an axially inward direction in alignment with the rotational axis of shaft 56. As shown, baffle 146 axially extends slightly beyond boss 86 and convergingly channels incoming air into the center of fan 66. As a result of guiding the incoming air into the fan center, a greater fan discharge air flow velocity is realized particularly at the blade tips of the fan than would be the case if no baffle were provided, thus assuring an increased fan efficiency and more definite air flow pattern.

In addition to establishing a high velocity air flow pattern in end bell 58, baffle 146 concentrates the air flowing through inlet openings 112 closely around boss 86. As a result of this strong concentration of air around boss 86 an increased cooling of boss 86 and bearing 92 is obtained. This together with the lesser working pressures exerted on sleeve bearing 92 due to its remote location from the opposite loaded end of shaft 56 avoids the necessity of providing for a more expensive and superior form of bearing, such as a ball bearing together with its more complicated mounting construction. A sleeve type bearing, such as bearing 92, may, therefore, effectively be utilized without diminishing the trouble-free operating life of the motor or reducing the accuracy of motor shaft alignment axially or radially.

Figure 3:
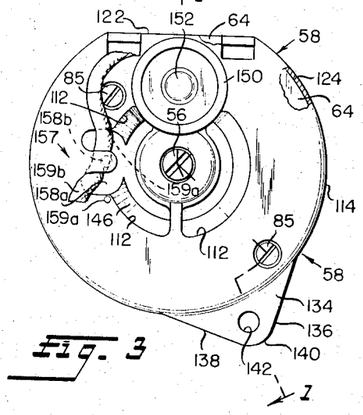
FIGURE 3 is a left end view of the motor of FIGURE 1.

With continued reference to end bell 58, a hollowed annular socket 150 is provided forming a through bore with its longitudinal axis extending in parallel radially offset relationship to the longitudinal axis of boss 86. As best seen from FIGURE 5, socket 150 is axially outwardly directed from end wall segment 108 and protrudes slightly beyond boss 86 with a common wall portion indicated at 151 dividing the interiors of socket 150 and boss 86 respectively. Socket 150, as best seen from FIGURE 3, is formed radially inwardly of the outer surface of chordal segment 126.

Received in socket 150 is an overload relay 152. Electrical conductors indicated at 156 are connected to relay 152 and extend through socket 150 for connection with stator 52.

With the foregoing construction of end bell 58, fan 66 is disposed in an air ventilating chamber 130 (FIGURE 1) defined by end bell 58 and the left-hand end faces of rotor 54 and stator core 64 as viewed from FIGURE 1. An air baffle 146 directs air axially inwardly through openings 112 into fan 66 which in turn propels the air radially in intimate wiping contact with ring 71 absorbing heat conducted to ring 71 from rotor 54. After wiping the axially outwardly directed face of ring 71, the heated air is radially discharged at the tips of blades 70 where it impinges against the inwardly facing axially directed surfaces of stator winding 62 which deflects the air flow back toward end wall segment 108 of end bell 58. As a result, the air discharged from fan 66 is swept axially between winding 62 and end wall segment 108, thus intimately wiping the interior surface of end wall segment 108 to transfer heat to end bell 58 transmitted to the air from rotor 54 and to also facilitate the transfer of heat from stator winding 62 to end bell 58 by convection. As the air flows radially beyond stator winding 62, it is deflected axially inwardly by skirt 110 into a confined annular space between stator winding 62 and skirt 110 to wipe the radially outwardly directed surfaces of winding 62 and the radially inwardly directed surfaces of skirt 110 thus absorbing and transferring further heat from winding 62 to end bell 58 by convection.

The axially directed stream of air passing radially between stator winding 62 and end bell skirt 110 impinges against the end face of stator core 64 and is finally discharged outwardly through outlet openings 121 carrying that portion of heat not transferred to end bell 58.

By guiding the cooling air along the above-described sinuous path, an efficient wiping of the surfaces of ring 71 and stator 52 exposed in chamber 130 is accomplished and heat generated in stator 52 and rotor 54 by operation of motor 50 is carried away by the air stream. Also, by intimately wiping the entire interior surface of skirt 110 and substantially the entire interior surface of end wall segment 108, an appreciable amount of heat is transferred from stator 52 and rotor 54 by convection.

By intimately contacting stator core 64 with legs 116 of end bell 58, a further appreciable amount of heat is directly transferred to end bell 58 from core 64 by conduction. Since end bell 58 is made of high heat conductive metal such as aluminum or aluminum alloy, all of the heat transferred to the end bell is quickly withdrawn for dissipation into the air in a manner as will be presently described.

With continuing reference to FIGURES 1, 2 and 4, end bell 58 is formed with a flat sided motor mounting ear 134 extending radially outwardly from skirt 116 and having converging wall faces 136 and 138 terminating in a rounded outer end portion 140 thus providing for a large cross-sectional area adjacent to skirt 110 for conducting heat away from skirt 110. Ear 134 is formed with a pivot rod mounting bore 142 adjacent the outer end thereof. The axis of bore 142 extends parallel to the rotational axis of shaft 56 and the center of bore 142 is along a line passing radially through the center of shaft 56.

End bell 60 is substantially identical to end bell 58 except that it does not provide a socket 150, omits baffle 146 and the chord strain relief ear and provides, through boss 88, a ball bearing seat. Therefore, the same reference numerals have been applied in the drawings.

As shown in FIGURES 1, 1a, 2 and 3, the outwardly facing surface of chordal segments 122 is substantially contained in the plane of the flat stator core chordally extending surface 126. As a result, a substantially smooth flat chordal motor face is provided from between the axially outwardly directed faces of end bells 58 and 60. This flattened chordal motor surface is utilized to accomplish a transfer of heat by direct conductive surface-to-surface abutment as will be particularly described, in the embodiment of the circular saw 48.

The integral high heat conductive character of fans 66 and 68 on rings 71 and their associated rods 72 further provides a high heat conductive path directly from the center of rotor 54 to the ring and fan structure at each end. As a result, operational motor heat is extracted from the rings and fan blades by the circulating air cooling the rotor end structure and encouraging heat flow toward and into the end bells.

The operational heat collected by end bells 58 and 60 is rapidly and harmlessly dissipated to surrounding ambient atmosphere and is also transferred away through conductive paths formed by motor mounting ears 134 which enable the transmission of operational heat to motor and tool mechanism housing wall surfaces of large heat dissipating areas serving in effect as radiation surfaces. The manner in which the dissipation of operational motor heat is specifically accomplished will be described hereinafter with respect to each of the embodiments of drill press 47, saw 48 and jointer 49.

With the foregoing casingless motor and end bell construction, it is clear that the exterior surfaces 124 and 126 of stator core 64 are fully exposed. These exposed exterior stator core surfaces 124 and 126, as will hereinafter be explained in greater detail, radiate heat directly into the surrounding air or conduct heat into other radiating elements of the tools exposed to cooling air circulation.

As a result of the rapid heat dissipation facilitated by conduction, convection and radiation as heretofore described, the overall axial and diametrical size of stator core 64 and rotor 54 may be effected when the present invention is employed effecting a reduction of substantial significance in overall size, weight and cost of the entire machine.

As best shown in FIGURES 1b and 3, an electrical motor lead guide retainer structure 157 is formed on end bell 58 and comprises an arm 158 extending radially inwardly over an aperture 158a formed in end wall segment 108. Arm 158 is spaced axially outwardly with respect to the axially outwardly directed end face of end wall segment 108 and is formed, at its outer free end, with an axially inwardly directed post 158b extending toward aperture 158a approximately midway between opposed edges 159 of aperture 158. Cooperating with post 158b are a pair of posts 159a projecting axially outwardly from the outwardly directed end face of wall segment 108 adjacent to edges 159. Posts 158b and 159a extend along a common upright line as best seen in FIGURE 3.

With the foregoing wire retaining construction, the electrical cord sheath 159b containing the electrical current supplying conductors to motor 50 is threaded under arm 158 and into aperture 158a in the manner shown, with posts 158b and 159a engaging sheath 159b to securely retain it in place. Thus, it is clear that the foregoing construction prevents the electrical supply conductors contained in sheath 159b from being pulled away from the connecting motor terminals and thereby prevents any strain from being applied to the connection of the electrical supply wires on the motor terminals.

CIRCULAR SAW

Figure 6:
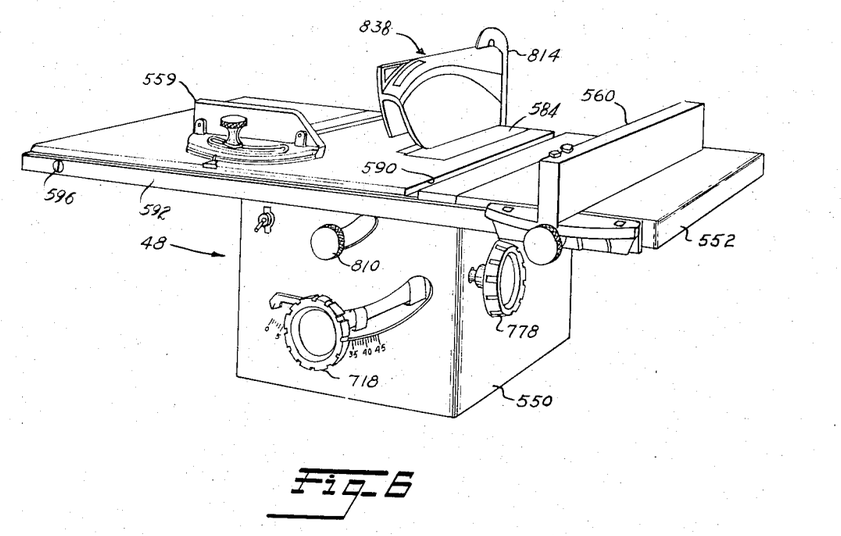
FIGURE 6 is a perspective view of a tilting arbor saw constructed in accordance with the principles of the present invention.

Turning now to FIGURE 6, the tilting arbor saw 48 referred to above comprises, generally, a housing 550 on the upper end of which is mounted a saw table 552, a motor 50a, similar to the motor 50 described above, a circular saw blade 556 rotatively fixed to the motor output shaft 56a, and a tilt-pivot assembly 558 suspending motor 50a from saw table 552 and arranged to permit angular and elevational adjustment of the saw blade. Tilting arbor saw 48 may be provided with the conventional accessories including a miter gauge 559 and a rip fence 560.

Figures 10, 18:
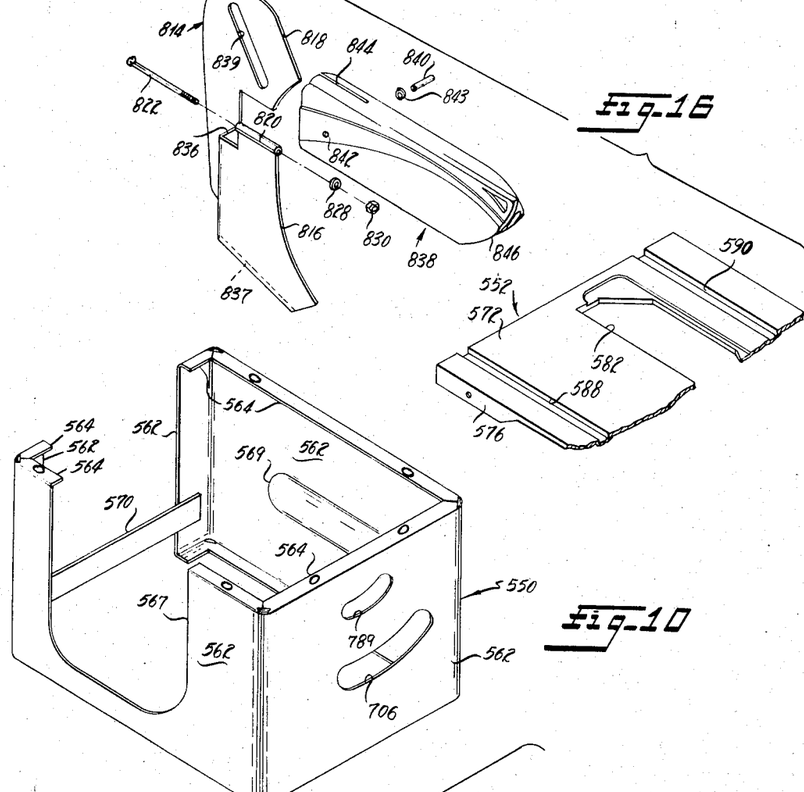
FIGURE 10 is a perspective view of the saw housing or base.
Figure 11:
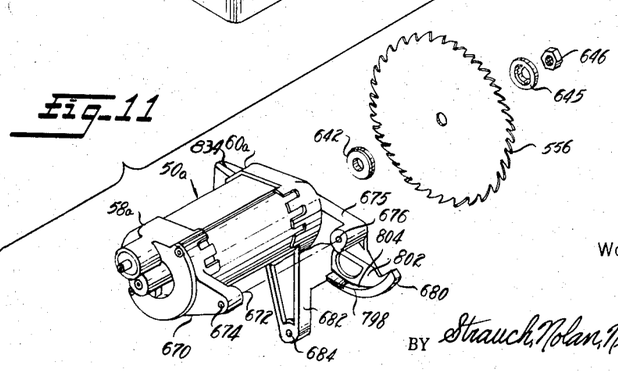
FIGURE 11 is a perspective view of the saw motor and the saw blade.

Housing 550, as may be seen from FIGURE 10, is of a lightweight, novel sheet metal construction, wholly unlike the conventional heavy cast iron base generally employed. The housing has a hollow, substantially open top, back and bottom, a boxlike configuration, and is preferably fabricated from 20 gauge sheet steel although other suitable materials may, of course, be employed.

The upper edge portions of the four vertical side walls 562 of the housing are turned or bent inwardly to provide horizontal mounting flanges 564 to which saw table 552 is fastened by bolts 566 and lock washers 568. Mounting flange 564 extends along the front and both sides of housing 550 but, on the back side, terminates a short distance from the intersections of the back and the two side walls. The left-hand side of housing 550 is provided with a vertically oriented U-shaped slot 567 through which motor 50a extends. An outwardly extending enlargement 569 on the right hand side of housing 550 provides a recess which receives the lower portion of saw blade 556 when the latter is tilted to make a thin bevel cut. As is best shown in FIGURE 10, a transversely extending strap or stiffener 570 extends between and is fastened to the oppositely disposed wall portions of rear wall 562, further strengthening and utilizing housing 550.

Saw table 552, which is preferably of one-piece die-cast aluminum construction, has a large area, thin section portion 571 defining a flat, horizontal work surface 572, integral depending ribs such as 574 and 575 (see FIGURE 9) and a peripheral rim 576, the ribs and rim serving to strengthen and rigidify the table. Spaced apart, depending integral lugs 578, 579 and 580 are provided intermediate the lateral edges of the table for suspending tilt-pivot assembly 558.

The thin section work surface defining portion 571 of the saw table is provided with a longitudinally extending slot or window 582 (see FIGURE 7) through which saw blade 556 extends. The major portion of this window is normally covered by a table insert 584 which is disposed in a recess 585 adjacent the right-hand periphery of window 582 so that its top surface is flush with work surface 572 and secured to the table by screws 586 (only one of which is shown). Table insert 584 may be removed when it is desired to gain access to the output shaft 56a of motor 50a (which, as will become apparent, comprises the arbor on which saw blade 556 is mounted) to remove or install the saw blade.

Saw table 552 is also provided with conventional longitudinally extending grooves 588 and 590 for receiving and guiding miter gauge 559. A laterally extending, rectangularly sectioned bar 592 is attached to spaced apart integral lugs 594 formed on the table rim at the front side of saw table 552 by machine screws 596 which are threaded into tapped apertures 598 in the integral lugs 594 (see FIGURE 9). Bar 592 mounts rip fence 560 for laterally adjustable movement in the conventional manner.

Assembly 558, referred to above, consists of a flat-bottomed, substantially U-shaped, die-cast, aluminum, angle bracket 602, attached by machine screws 604 to the lugs 578, 579 and 580 depending from saw table 552 and a bevel control mounting member 606 pivotally mounted on angle bracket 602.

Figure 7:
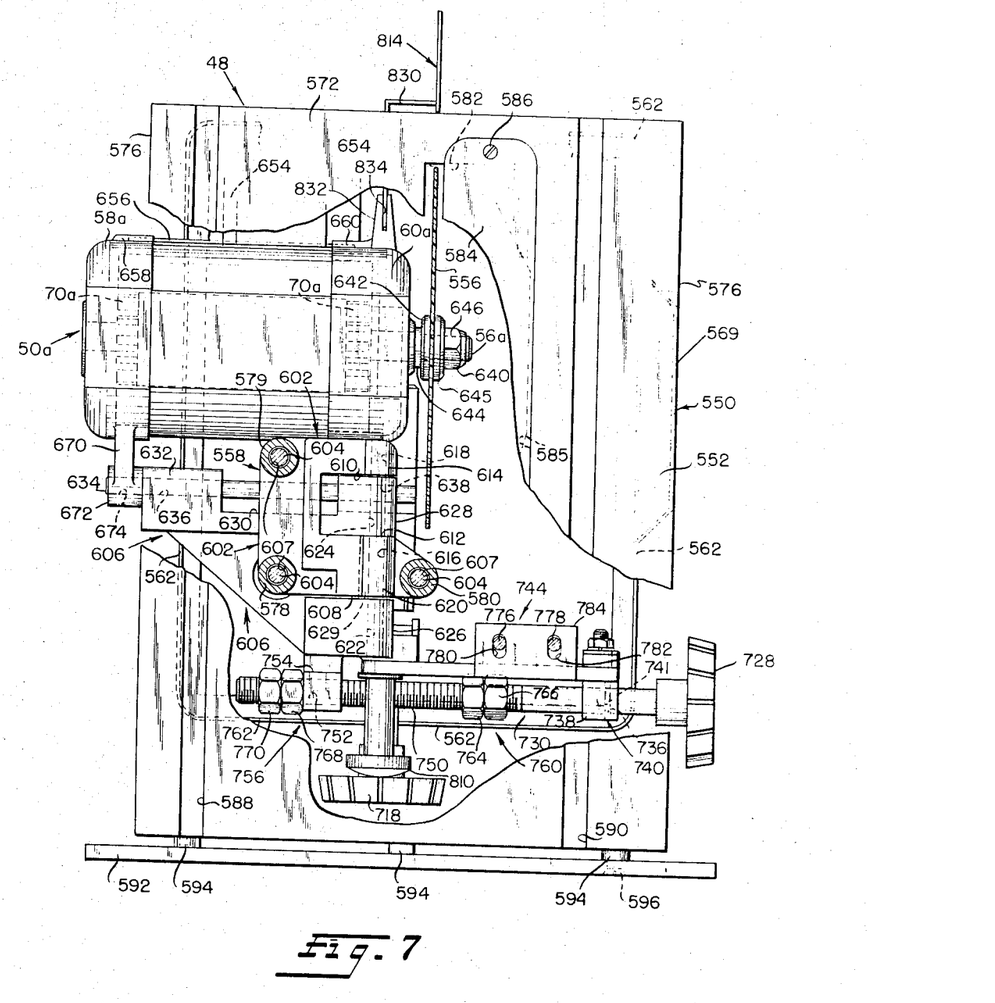
FIGURE 7 is a plan view, partly in section, of the saw illustrated in FIGURE 6.

The apertures 607 in angle bracket 602 through which machine screws 604 extend are purposely oversize (see FIGURE 7). In this manner, angle bracket 602 may be rotated or twisted with respect to the longitudinal axis of the table. This permits saw blade 556 (which is mounted on the shaft of motor 50a which, in turn, is suspended from angle bracket 602 by bevel control mounting bracket 606) to be quickly and accurately aligned parallel to the miter gauge slots 588 and 590 so that it will not bind in the material being sawed.

Adjacent the ends of the legs 608 and 610 of angle bracket 602 are integrally formed upwardly extending bosses 612 and 614. Axially aligned apertures 616 and 618 in bosses 612 and 614 receive an angle hinge pin 620.

The axis of hinge pin 620 is located so that, when saw blade 556 is tilted to produce a bevel cut, it will rotate about the line of intersection between the plane of the saw blade and the plane of work surface 572. This is a conventional arrangement, the theory of which is developed in United States Patent No. 1,324,136, issued to R. S. E. Turner. A typical example of the application of Turner's invention to a tilting arbor saw is found in United States Patent No. 2,008,673, issued to W. T. Ocenasek.

Bevel control mounting member 606, as may be seen from FIGURE 7, is a generally L-shaped member that is die-cast preferably from aluminum or a similar lightweight high heat conductive metal. Mounting member 606 is mounted for lateral tilting movement on angle hinge pin 620 which extends through axially aligned apertures 622 and 624 in spaced apart upwardly and then angularly extending integral pivot arms 626 and 628 connected by an integral flange 629. It will be noted that pivot arms 626 and 628 closely surround boss 612 on angle bracket 602, preventing bevel control mounting member 606 from shifting on angle hinge pin 620. At the lower end of the angularly extending portion of pivot arm 628, an integral vertical flange 630 extends transversely, terminating in a rearwardly directed, vertically extending projection 632. An elevating hinge pin 634, as is best shown in FIGURE 7, extends transversely of the saw through axially aligned apertures 636 in projections 632 and 638 in the vertically extending portion of pivot arm 628.

Motor 50a is pivotally mounted on elevating hinge pin 634 by end bells 58a and 60a which are similar to end bells 58 and 60 with certain exceptions which will be pointed out somewhat later. The motor output shaft 56a, which is substantially identical to output shaft 56, terminates, at its right-hand end, in a threaded portion 640. Shaft 56a is the arbor of saw blade 556 which is secured against a shaft collar 642, axially fixed on the shaft against a shoulder 644, by a saw collar 645 and a motor shaft nut 646.

Figure 13:
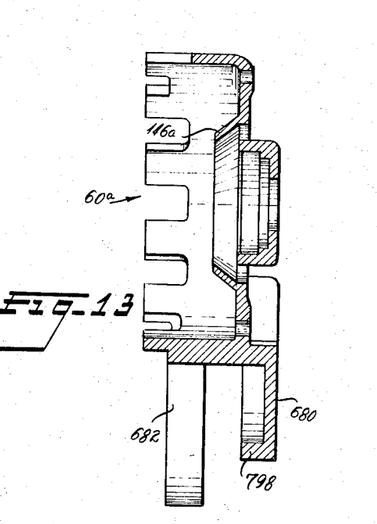
FIGURE 13 is a sectional view of an end bell of the saw motor taken substantially along line 13—13 of FIGURE 14.

An important feature of the novel tilting arbor saw provided by the present invention is the novel arrangement for dissipating from motor 50a the heat generated by its operation. To this end, both of the end bells 58a and 60a are formed with conical baffles 146a (see FIGURE 13) identical to the baffles 146 illustrated in FIGURE 5 and described in conjunction with end bell 58. As do baffles 146, baffles 146a channel the inflowing motor-cooling air, thus providing a more definite flow pattern and, therefore, more efficient distribution of the cooling air.

Unlike the drill press described in the parent application Ser. No. 149,002, the tilting arbor saw 48 is not provided with an air circulating fan in addition to the low capacity fans (70a identical to the above-described fan 70) formed on the rotor of motor 50a. It has been found that, because of the more efficient distribution of cooling air resulting from the provision of baffles 146a and a novel arrangement for conducting heat away from motor 50a and dissipating it from saw table 552, the additional fan is unnecessary.

As may be seen from FIGURE 7 when saw blade 556 is in its maximum depth of cut position, end bells 58a and 60a have a large area engagement with the bottom side of the saw table. Since both the end bells and the saw table are fabricated of aluminum, a metal having extremely high conductivity, heat transferred to the end bells by the passage of cooling air through them is rapidly conducted away from the motor to the table which, having a large radiating surface, as quickly radiates the heat into the surrounding atmosphere.

In addition, a substantial portion of the motor-generated heat is conducted away from end bells 58a and 60a through their integral flange and arm portions to the bevel control mounting member 606 which, in turn, conducts the heat through the angle plate 602 to saw table 552 where it is dissipated. In this respect, it should be noted that the end bells, bevel control mounting member 606, and angle plate 602 are all fabricated preferably of highly conductive aluminum and further, that all of these members have large surface areas. Consequently, each of these members, as well as saw table 552, is an effective radiator of heat.

Moreover, saw blades 556, as it revolves, generates local air currents which, sweeping over end bells 58 and 60 and the stator motor 50, carry away a substantial amount of heat. It is apparent then, that the above arrangement provides a highly effective combination of convective and conductive heat transfer which efficiently dissipates the heat generated by motor 50.

It has further been discovered, surprisingly, that the cooling efficiency decreases only an insignificant amount when saw blade 556 is lowered to a less than maximum depth of cut position and the flat surface portions of end bells 58a and 60a are no longer in contact with saw table 552. In this case, a channel or passage is formed between the end bells 58a and 60a and the under surface of table 552. The convection currents generated by the rotation of saw blade 556 sweep through this passage carrying away heat radiated from the end bells and the stator of the motor, particularly at the lesser work load positions of the saw blade.

Another novel feature of the tilting arbor saw provided by the present invention is the arrangement for mounting relay 648 and capacitor 650 on motor 50a. As may be seen from FIGURE 9 relay 648 and capacitor 650 are mounted in a housing 652, preferably fabricated from nylon or a similar non-conductive material, which is contoured to fit against the stator of motor 50a. The side walls 654 of housing 652 are provided with aligned notches (not illustrated) through which extend a fastening strap 656.

Figure 9:
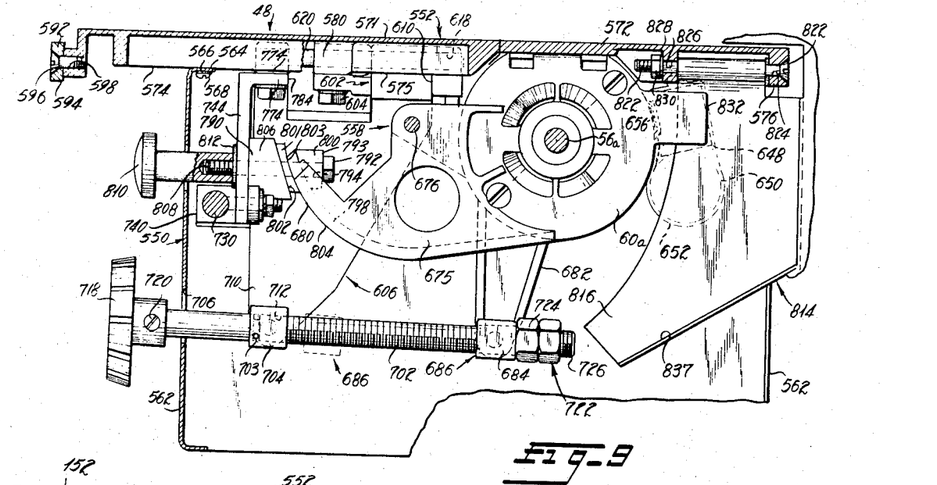
FIGURE 9 is a right-hand elevation, partly in section, of the saw.
Figure 14:
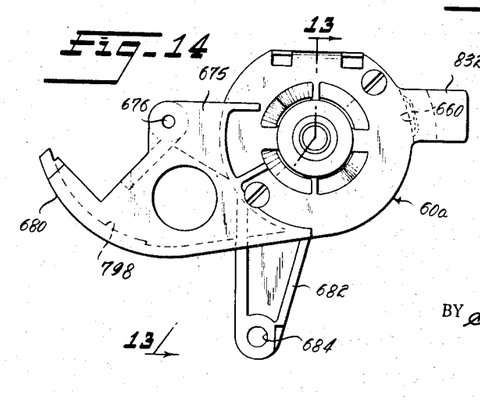
FIGURE 14 is an end view of the end bell illustrated in FIGURE 13.

Referring next to FIGURES 9 and 14, end bells 58a and 60a are dished out to provide recesses 658 and 660, respectively, between the end bells and the stator of motor 50a. The ends of strap 656 extend into the recesses whereby the surrounding portions of the ends bells secure the strap—and, therefore, housing 652—in its position against the stator.

End bell 58a is identical to the end bell 58 described above with the exception that end bell 58a is provided with an integral flange 670 terminating in an enlarged boss 672. Elevating hinge pin 634 extends through an aperture 674 in enlarged boss 672, the aperture being dimensioned to allow free pivotal movement of end bell 58a and therefore, motor 50a, about pin 634.

End bell 60a, best shown in FIGURE 14, is similar to the end bell 60, as was mentioned above, but has certain added structure as follows in addition to the conical baffle 146a. Adjacent its outer end, bell 60a is provided with a forwardly extending integral arm 675 pivotally mounted on elevating hinge pin 634 which extends through an aperture 676 adjacent the upper edge of the arm. An integral, forwardly and upwardly directed extension of the arm serves as a locking leg 680 which comprises part of a novel arrangement for locking the saw blade 556 at the desired elevation and tilt angle and which will be explained presently in some detail.

Figure 12:
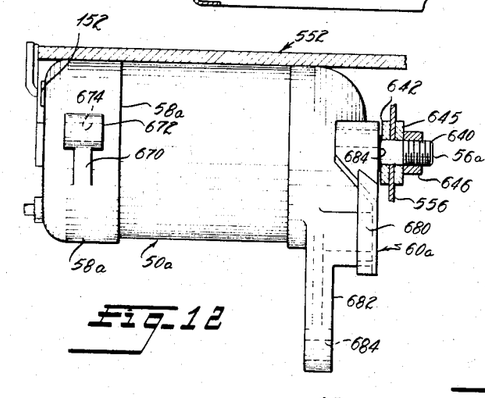
FIGURE 12 is a side view of the saw motor.

Saw blade 556 is raised by pivoting the unitary assembly of sawmotor 50a, saw arbor 56a, saw blade 556, and end bells 58a and 60a in a counterclockwise direction about elevating hinge pin 634 and is lowered by pivoting the assembly in the reverse or clockwise direction. To accomplish the pivoting movement, end bell 60a is provided with a second integral arm 682 which extends downwardly from the bell and is provided, at its lower end, with an aperture 684. (See FIGURES 12.)

As is shown in FIGURE 15, a control nut 686, which has a cylindrical shank 688 extending through oversized aperture 684, is secured in place by a flat washer 690, a lock washer 692, and a nut 694, threaded onto a reduced diameter extension 696 of the shank. It will be noted that shank 688 is so dimensioned, that, when control nut head 698 is abutted against the forwardly directed side surface of arm 682, shank 688 extends outwardly past the opposite control arm side surface. Thus, when nut 694 is tightened, flat washer 690 will engage the annular surface of the end of shank 688, providing clearance between it and arm 682. As a consequence, control nut 686 is free to rotate in aperture 684.

The control nut 686 is provided with a threaded aperture 700 through which extends a threaded elevating screw 702. Elevating screw 702 extends forwardly (see FIGURE 9) through a control sleeve 704 and an arcuate slot 706 in the front wall 562 of housing 550 (see FIGURE 10). Control sleeve 704, which is mounted at the lower end of a downwardly directed extension 710 of bevel control mounting member 606, is constructed in the same manner as control nut 686 except that a bore corresponding to aperture 700 is not threaded but is smooth, shaft 702 being restrained axially by a cross pin 703 through sleeve 704 cooperating with a groove in shaft 702 and, like that member, may rotate freely with respect to the member on which it is mounted.

The novel double-pivot mounting of elevating screw 702, described above, permits the screw to pivot with respect to end bell 60a and bevel control mounting member 606 as saw blade 556 is raised and lowered.

To move saw blade 556 upwardly to increase the depth of cut (or downwardly to decrease the depth of cut) elevating screw 702 is rotated by a preferable die-cast aluminum control knob 718 rotatively fixed to its forward end by a setscrew 720. Since the elevating screw is prevented from moving axially by the cross pin 703 cooperating with a groove in elevating screw 702, this rotational movement causes the threaded elevating screw, engaging the threads in threaded aperture 700 of control nut 686, to drive the control nut along the screw to move end bell 60a—and, therefore motor 50a and saw blade 556—in a counterclockwise direction about elevating hinge pin 634, for example, raising the saw blade 556 with respect to the work-supporting surface 572 of saw table 550.

Another important feature of this invention is the novel limit stop 722, provided for arresting the clockwise movement of end bell 60a when the saw blade 556 reaches its uppermost or maximum depth of cut position. In this respect, it is to be noted that, when saw blade 556 is raised to the maximum depth of cut position, the flattened tops of end bells 58a and 60a abut the underside of saw table 550. If, at this point, continued counterclockwise torque were exerted on end bell 60a, which can rotate no further, extension 682 of end bell 60a could conceivably be broken off. It is the function of limit stop 722 to prevent continued rotation of elevating screw 702 after saw blade 556 reaches its maximum elevation so that the undue stresses, described above, cannot be imparted to end bell extension 682.

Limit stop 722 consists of a pair of lock nuts 724 and 726 threaded onto the rear end of elevating screw 702. Lock nuts 724 and 726 are so positioned that, when saw blade 556 reaches its uppermost position, the forward nut 724 will engage and bind against the enlarged head 698 of control nut 686, preventing further rotation of elevating screw 702.

The retraction of saw blade 556 from its maximum depth of cut position is caused by rotating control knob 718 to pivot end bell 60a in a clockwise direction about elevating hinge pin 634. This retraction of the saw blade is limited by the engagement of the enlarged head 698 of control nut 686 with the rear edge of the depending arm or extension 710 of end bell 60a. This position of control nut 686 is shown in phantom outline in FIGURE 9.

Saw blade 556 is tilted to produce a bevel cut by rotating a control knob 728 positioned on the right-hand side of the tilting arbor saw 48. Control knob 728 is attached to the end of an angle adjusting screw 730 by a set screw 732 (see FIGURE 8). Angle adjusting screw 730 extends to the left through an aperture 734 in the right-hand side wall 562 of housing 550, and through an axial bore 736 drilled in the enlarged head 738 of a control sleeve 740. Control sleeve 740, which is mounted on the lower end of a depending arm 742 of a locking bracket 744, is identical with the control sleeve 704, described above and permits angle adjusting screw 730 to pivot with respect to locking bracket 744 as saw blade 556 is tilted from the vertical or 90° position. Cross pin 741 through sleeve 740 cooperating with a groove in adjusting screw 730 prevents it from moving axially with respect to locking bracket 744 which is an integral die-cast structure of lightweight high heat conductive metal such as aluminum.

A threaded portion 750 of angle adjusting screw 730 extends through a threaded bore 752 in the enlarged head 754 of a control nut 756. Control nut 756, which is identical with the control nut 686 described above and illustrated in FIGURE 15, is mounted on the depending integral leg 710 of bevel control mounting member 606. Control nut 756 travels along angle adjusting screw 730 as the latter is rotated, pivoting bevel control mounting member 606 about angle hinge pin 620. In addition, the construction of control nut 756 permits angle adjusting screw 730 to pivot with respect to the bevel control mounting member as the latter pivots about the hinge pin. This double-pivot mounting of angle adjusting screw 730 prevents that member from binding as the bevel control mounting member is rotated.

To produce a bevel cut then, control knob 728 is rotated thereby rotating angle adjusting screw 730 and causing control nut 756 to travel toward the front of the saw along the threaded portion 750 of control nut 730. As control nut 756 moves forward, it pivots bevel control mounting bracket 606 in a counterclockwise direction about angle hinge pin 620, tilting saw blade 556 from the full line (90°) position of FIGURE 8 toward the 45° position shown in phantom outline in the same figure. It is to be noted that, since elevating screw 702 is mounted only on extension 682 of end bell 60a and extension 758 of bevel control mounting member 606 and since both of these members pivot together (end bell 60a being suspended solely from member 606), tilting of saw blade 556 will not be impeded by elevating screw 702 which will merely move in an arcuate path as the blade is tilted. And, as was pointed out above, the front wall 562 of saw housing 550 is provided with an arcuate slot 706 to accommodate this arcuate movement of the elevating screw.

Pivotal movement of the bevel control mounting member 606 is limited between the 90° and 45° positions (show in full and dotted lines in FIGURE 8) of saw blade 556 by limit stops 760 and 762, respectively. Limit stops 760 and 762 are similar to limit stop 722 and function in like manner. Limit stop 760 consists of a pair of lock nuts 764 and 766 threaded on angle adjusting screw 730 between control nut 756 and control sleeve 740. Similarly, limit stop 762 comprises a pair of lock nuts 768 and 770 threaded on angle adjusting screw 730 between control nut 756 and the rear end of the screw.

When it is desired to tilt saw blade 556 from the 90° position to the 45° position, as was discussed above, control knob 728 is rotated clockwise causing control nut 756 to travel forwardly along the threaded portion 740 of angle adjusting screw 730, thereby pivoting bevel control mounting bracket 606, saw motor 50a, and saw blade 556 in a counterclockwise direction about angle hinge pin 620. When saw blade 556 reaches the 45° position, control nut 756 will engage—and bind against— the lock nut 764 of limit stop 760, preventing further movement of the control nut and precluding the possibility that undue stress might be placed on depending leg 758 of bevel control mounting member 606. In a like manner, when control knob 728 is rotated in a counterclockwise direction, control nut 756 will travel to the rear along the threaded portion 740 of angle adjusting screw 730, tilting saw blade 556 from the 45° position toward the 90° position. When saw blade 556 reaches the 90° position, control nut 756 will engage and bind lock nut 768 of limit stop 762, preventing further counterclockwise rotation of elevating screw 730, again eliminating the possibility of undue stress being placed on the depending leg 758 of the bevel control mounting member.

The locking bracket 744, referred to above, is attached to mounting pads 772 and 774 integrally formed on the bottom of saw table 552 by machine screws 776 and 778. As is shown in FIGURE 7, machine screws 776 and 778 extend upwardly through elongated slots 780 and 782 in a horizontal flange 784 of the bracket. This arrangement allows the bracket to be precisely aligned when the saw 48 is assembled.

Figure 8:
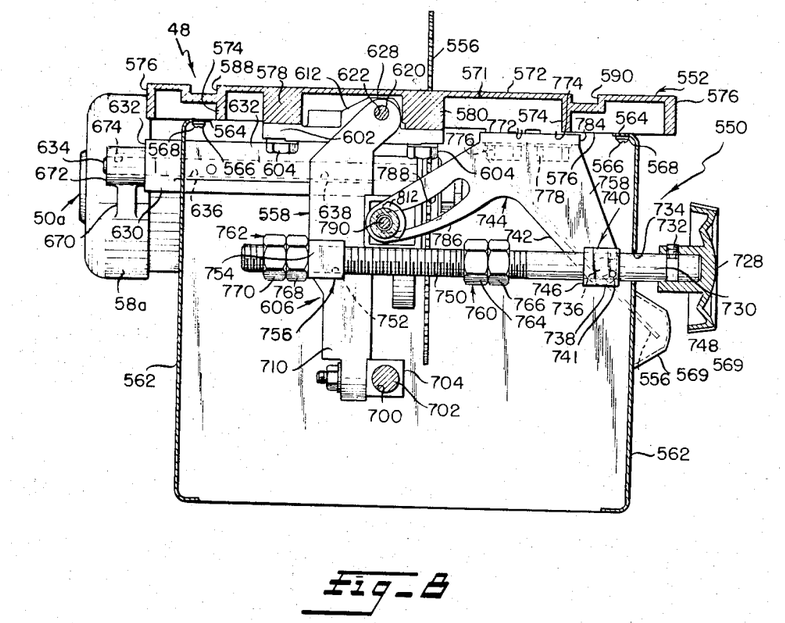
FIGURE 8 is a front elevation, partly in section, of the saw.

Referring next especially to FIGURE 8, locking bracket 744 is provided with a downwardly directed extension 786 in which is formed an elongated arcuate aperture 788. Extending forwardly through arcuate aperture 788 and a coextensive arcuate opening 789 in front wall 562 of housing 550 (see FIGURE 10) is a square-headed locking bolt 790. The head 792 of locking bolt 790 is engaged by a locking wedge 793 (see FIGURES 9, 14, and 17) journalled on the bolt which extends through a bolt-receiving bore 794 in the wedge. Locking wedge 792 has a convex face portion 796 (FIGURE 17) which rides along the upper surface of a horizontal skew-like track or flange 798 formed on the lower edge of locking leg 680 of end bell 60a.

As locking wedge 792 slides along flange 798, it is prevented from rotating by the sliding engagement of the side surface 800 of the locking wedge and the left-hand vertical surface 802 of locking leg 680. This arrangement is an important feature of the present invention because locking wedge 792 is fabricated from a metal substantially harder than the relatively soft aluminum from which end bell 60a is cast. Therefore, if the locking wedge were permitted to rotate as it slides along flange 798, its edge would tend to "dig" into and damage the locking leg 680.

Figure 17:
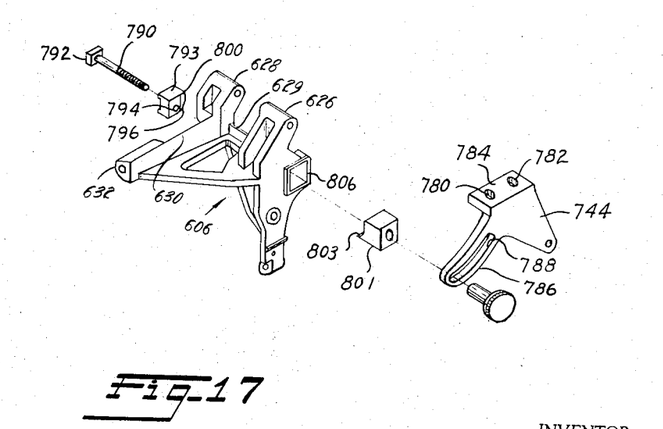
FIGURE 17 is a perspective view of the bevel control mounting member employed in the saw.
Figure 19:
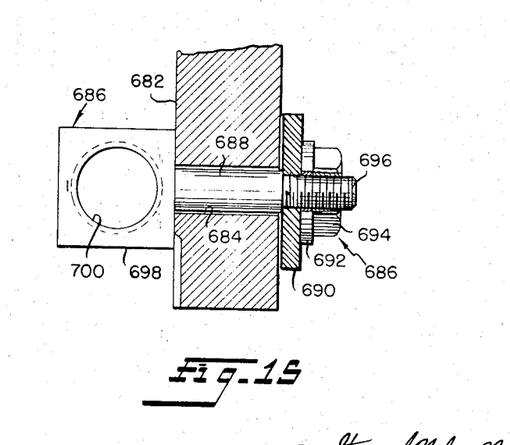

Also journalled on the locking bolt 790—on the opposite side of locking leg 680 from wedge 792—is a locking sleeve 801. As is best shown in FIGURES 9 and 17, locking sleeve 801 has a concave face 803 with the same radius of curvature as the bottom edge 804 of locking leg 680 so that the locking leg may slide smoothly across this face.

As is shown in FIGURE 9, locking sleeve 801 extends through a hollow projection 806 integrally formed on the side of bevel control mounting member 606 into abutting relationship with the rear side of locking bracket 744. Although projection 806 has been illustrated with a square aperture, it is to be understood that this particular configuration is not essential. It is only necessary that the particular configuration selected prevents the relatively hard locking sleeve 801 from rotating about locking bolt 790 and "digging" into the relatively soft aluminum from which locking arm 680 of end bell 60a is cast.

The forward end of locking nut 790 is threaded into a drilled and tapped aperture 808 in a locking knob 810 which abuts a washer 812 mounted on bolt 890 adjacent the front side of locking bracket 744. As is best shown in FIGURE 9, locking knob 810 extends forwardly from saw housing 552 to a point where it may be easily manipulated by the operator.

The above-described components provide a novel double-locking arrangement, locking saw blade 556 at both the desired depth of cut and the desired tilt angle. To elaborate, when locking knob 810 is rotated in a clockwise (tightening) direction, locking bolt head 792, locking wedge 793, locking leg 680 of end bell 60a, locking sleeve 801, locking bracket 744, and locking knob 810 are all drawn into a tight, motion-preventing relationship. In this relationship, the frictional forces between (1) locking leg 680 and (2) locking wedge 793 and locking sleeve 801, prevent end bell 60a from rotating about elevating hinge pin 634, thus maintaining saw blade 556 in the position furnishing the desired depth of cut. Similarly the frictional forces between locking sleeve 801 and locking bracket 744, locking bracket 744 and washer 812, and washer 812 and locking knob 810, prevent locking bolt 790 from moving along the arcuate slot 788 in mounting bracket 744. This, therefore, prevents movement of locking sleeve 801 (which, it will be remembered is journalled on locking bolt 790) and tilting movement of bevel control mounting member 606, an integral portion 806 which, as was explained above, surrounds the locking sleeve.

Conversely, by rotating locking knob 810 in a counterclockwise direction, these grip-forces are released and, consequently, the depth and angle of cut of saw blade 556 may be altered by manipulation of control knobs 718 and 728.

Another important feature of the present invention is the novel splitter 814 best shown in FIGURES 9 and 16. As may be seen from these figures, splitter 814 is a unitary member having a first portion 816 extending below saw table 552 and a second portion 818 extending above the table. The lower portion 816 of splitter 814 has, at its upper end, an integrally formed, hollow, bolt-receiving flange 820. Referring now particularly to FIGURE 9, splitter 814 is pivotally mounted on a machine screw 822 which extends through aligned apertures 824 and 826 in, respectively, peripheral rim 576 and one of the depending ribs 575 of saw table 552. Machine screw 822, which is located in axial alignment with angle hinge pin 620, is secured in place by a nut 828 and a lock washer 830.

With continued reference to FIGURE 9, a rearwardly extending flange 832 integrally formed on end bell 60a is provided with a rearwardly opening slot 834 intermediate its side surfaces into which the lower portion 816 of splitter 814 extends (see FIGURE 7). Therefore, as saw blade 556 is tilted by the manipulation of the control knob 728, splitter 814 will be tilted to the same extent so that its upper portion 818 will remain in the same plane as saw blade 556.

It will be noted that the lower portion 816 of splitter 814 extends well below the level of saw table 552. This is necessary so that, when saw blade 556 is retracted to its lowest position, the integral flange 832 on end bell 60a will remain in engagement with the splitter.

The upper and lower portions 816 and 818 of splitter 814 are connected by a transversely extending, integral connecting portion 836, so dimensioned that, when saw blade 556 is in the vertical or 90° position, the upper portion 818 of splitter 814 is aligned in the same vertical plane as the saw blade. A flange 837 bent horizontally from the lower portion 816 of splitter 814 strengthens and prevents twisting of the splitter.

A further important feature of this invention is that the splitter 814 is employed to mount the saw guard 838. Referring particularly to FIGURE 16, an upwardly and rearwardly extending slot 839 is formed in the upper portion 818 of splitter 814. A guard mounting roller 840 extends through this slot and through aligned apertures 842 in saw guard 838. The guard mounting roller 840 is secured in place by a guard mounting roll pin 843. Guard 838 is provided with a vertically and forwardly extending slot 844 so that, in the assembled position, the rear portion of guard 838 surrounds, and may slide up and down in relation to, the upper portion 818 of splitter 814, roller 840 moving up and down in slot 839 as saw guard 838 is raised and lowered.

When a board or other material is fed into the saw blade 556, it will engage the rounded forward end portion 846 of saw guard 838, moving the guard rearwardly and upwardly in the slot 839 until a balance point is reached and the board passes under the nose of the guard 846.

As is apparent from the foregoing description of tilting arbor saw 48, a maximum number of multi-function components are employed. First, it will be noted that the end bell 60a, a single integral casting, serves a number of useful purposes. First, the integral conical baffle 146a formed thereon channels the cooling air into the motor 50a to efficiently remove the heat generated by the operation of the motor. The end bell, because of its large surface area, and its fabrication from highly heat-conductive aluminum, serves as a very efficient radiator of heat, conducting away and dissipating through radiation from its surfaces a substantial amount of the heat generated by the motor. End bell 60a, in addition, provides a flange 675 by which motor 50a is pivotally mounted for varying the depth of cut of saw blade 556. Moreover, end bell 60a includes, an integral locking bracket 680, a flange 832 for maintaining splitter 814 in the same plane as saw blade 556 when the latter is tilted to make a bevel cut, and a depending extension 682 which mounts the adjusting screw 702 employed for varying the elevation of saw blade 556.

Similarly, the bevel control mounting member 606 is a unitary aluminum die-casting performing a number of functions. First, it mounts the elevating hinge pin 634 on which the end bells 58a and 60a are pivoted to vary the depth of cut of saw 556. Also, member 606 mounts the saw for tilting movement on angle hinge pin 620. Still further, member 606 mounts both the elevating adjusting screw 702 and the angle adjusting screw 730, and a portion of the novel double-lock arrangement discussed above. Thus, it will be seen that these two members, end bell 60a and bevel control mounting member 606 together with the end bell 58a and the angle bracket 602 are the only members necessary to mount the saw motor 50a and saw blade 556 for tilting and elevational adjustment, for positioning the splitter 814, and for conducting away and dissipating the heat generated by the operation of motor 50a. Because of the novel construction and arrangement of the components described above, it has been possible to reduce the over-all size of a tilting arbor circular saw, to simplify its construction and assembly, and to reduce its weight by over 30%.

Here again, the size reduction made possible by the small casingless motor and the design of the housing and operating parts makes possible a circular saw delivering a power output equivalent to present day commercial home workshop circular saws and having a depth of cut at 90° of one and eleven-sixteenths inches, a depth of cut at 45° of one and three-quarter inches, a six inch table exposure in front of the blade, a rip capacity to the center of a nine and one-quarter inch board and extendable with the normally offered table wing extensions (increasing table size from fourteen by ten and one-half inches to fourteen by twenty-four inches) to the center of a twenty and one-quarter inch board, and overall dimensions for packaging of seventeen inches depth, thirteen inches width and seventeen and one-half inches in height. Here again, these work capacity dimensions are comparable to existing competitive commercial circular saws, yet the overall dimensions and weight permit unit packaging (including the table extensions) for over the counter department store selling.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A power driven circular saw of minimal overall dimensions adapted for handling workpieces commonly encountered in conventional home or cabinet workshops and conserving floor and storage space comprising a housing including a ribbed work support table of non-rusting, high heat-conducting, die cast aluminum, said housing forming a motor mount and a radiating surface of large area and high thermal conductivity exposed to a heat absorption medium, said table having a longitudinally extending blade opening and a depending walled enclosure providing support walls along each edge of the table, a tilt bracket assembly including a pivot bracket fixed to said mount and a tilt bracket directly pivotally connected to said pivot bracket, motor means comprising an electric motor having a stator of small diameter, a rotor and rotor shaft coaxially disposed within said stator with the shaft ends extending beyond the end faces of said stator, and a pair of end bells of high heat conductive material fixed in butted relation to said stator, said end bells having heat conductive mounting means pivotally connected to said pivot bracket and having thermal connection therewith, said end bells cooperating with said tilt bracket and said pivot bracket to support said electric motor directly beneath said table at one side of said blade opening with its rotor shaft normal to and extending beyond a plane containing the longitudinal axis of said blade opening with an exposed peripheral area of said stator normally abutting the underface of said table throughout the axial length of the stator to establish a direct heat conduction path from said stator to said table and heat conducting paths through said end bells to said table; air propulsion fans on said rotor and being disposed within each end bell, said end bells each having (a) bearing means supporting said rotor, (b) axially and radially directed sets of air circulation passages, and (c) baffle means in said end bells to channel the entering air into the center of its related fan through said axial air circulation passages, across the related stator end face and radially outwardly through said radial air circulation passages; and a circular saw blade fixed on said rotor shaft for rotation therewith in the plane containing the axis of said blade opening and having a portion protruding through said blade opening to engage a workpiece fed along said table to said blade portion, said air propulsion fans being effective to circulate air into and through said end bells at both ends of said motor, across the respective related ends of said stator and radially outwardly through said end bells and against said table to extract heat from said motor parts and table and augment the conduction dissipation of heat from said stator, said high heat conductive motor mount cooperating with said end bells and said circulated air to extract heat generated in operation of said electric motor from said motor and to effect a rapid dissipation of said heat.

2. The machine tool of claim 1 wherein said end bells and tilt bracket assembly are of die cast aluminum to establish a heat conduction path from said stator to said table, said air propulsion fans circulate said air through said end bells in wiping contact with said end bells and discharge the air in wiping contact with said tilt bracket assembly to extract heat therefrom and further augment the dissipation of heat from said stator.

3. The machine tool of claim 1 wherein said motor is a casingless motor having an exposed stator formed of laminar plates delimited at one side by chordal surfaces arranged in mated side by side relation to form a planar area adapted to be butt contacted with said undersurface of said table to form an abutment heat transfer face of substantial area, wherein said end bells at one side are delimited by chordal surfaces arranged at respective ends of said stator planar area to form continuations of said planar surface of said stator, whereby a maximum area direct heat transfer contact is provided between said table and said stator and a minimal radial distance is established between the work support surface of said table and the axis of said rotor shaft to assure a maximum effective delivery of motor torque to the working saw blade protrusion through said table blade opening.

4. The machine tool of claim 2 wherein said pivot connection of said motor to said tilt bracket assembly comprises respective radially directed legs integrally formed on said end bells to lie in opposing predetermined angular relation to said exposed peripheral area of said stator when assembled therewith and terminating in apertured journal bosses cooperating with a tilt bracket supported pivot; one of said end bells is provided with an outwardly extending web segment of substantial area terminating in an arcuate clamp flange coaxially related to said tilt bracket supported pivot; said table is provided with a depending wall portion of high heat conductive metal paralleling the support pivot of said tilt bracket assembly and lying adjacent the path of movement of said arcuate clamp flange around said tilt bracket supported pivot; and clamp means having a pair of clamp blocks engageable with opposite faces of said clamp flange and a clamp screw extending therethrough and through an opening in said depending walled enclosure are axially slidably mounted on said tilt bracket to be actuated to opposingly grip and releasably secure said motor means in selected pivoted positions, said end bells, said end bell legs, said web segment and said depending wall portion being formed of high heat conductive metal additionally providing heat conduction paths for the generated motor heat and lying in the path of discharged air which acts to further extract and dissipate motor heat therefrom in passing thereover.

5. The machine tool of claim 1 wherein said tilt bracket is provided with a through opening paralleling the pivot axis of said tilt bracket; a first tilt screw mounting block is journalled in said through opening and provided with a tapped through bore extending therethrough at right angles to the axis of the journal connection provided by said through opening; a second tilt screw mounting block is pivotally suspended from said table undersurface on an axis paralleling the journal axis of said first tilt screw mounting block and provided with a tapped through bore extending therethrough at right angles to the pivot axis of said second tilt screw mounting block; a tilt screw is threaded through said tapped bores of said tilt blocks with one end extending through a slot in said depending walled enclosure to position said tilt bracket to normally maintain said saw blade in a plane normal to said table; and means is fixed to the extending end of said tilt screw to enable an operator to rotate said tilt screw and effect relative tilting movement of said tilt bracket and table to vary the angular relationship between said table and saw blade so bevel cuts of a workpiece may be effected.

6. The machine tool of claim 5 wherein said one end bell is provided with a depending leg terminating in a boss apertured in parallelism to the axis of said tilt bracket supported pivot to provide a journal opening; said tilt bracket is provided with a journal aperture similarly related to the axis of said tilt bracket support pivot; a respective elevating screw mounting block is journal in said respective journal aperture, each having a through tapped bore extending therethrough at right angles to its respective journal axis and axially aligned; an elevating screw threaded through said tapped bores of said elevating blocks with one end extending through a slot in said depending walled enclosure to normally position said rotor shaft around the axis of said tilt bracket supported pivot at a minimal distance below said table; and means is fixed to the extending end of said elevating screw to enable an operator to rotate said elevating screw and effect pivotal movement of said motor means around said tilt bracket supported pivot to position said rotor shaft varying distances below said table to establish selected blade area protrusions through said table blade opening.

7. A tilting arbor saw motor mount subassembly comprising a die cast table having (a) a pair of parallel miter gauge grooves formed in one surface thereof extending from one end to the other, (b) a blade opening located therein in the area between said miter gauge grooves and elongated in a direction paralleling said miter gauge grooves, (c) three mounting bosses having tapped bores therein formed on the opposite surface thereof to one side of said blade opening with one pair of said bosses spaced in parallelism to said miter gauge grooves and the third boss located in a plane containing the axis of the one of said tapped bores nearest said one table end and paralleling said one table end, said bosses forming a three point mount for a main operating mechanism support and alignment bracket; and a die cast main operating mechanism support and alignment bracket formed with a pair of upstanding aligned apertured ears determining a tilt bracket pivot axis and a set of three respective through bores spaced to cooperate with said three bosses and of slightly greater diameter than said tapped bores to permit limited shifting of said support and alignment bracket with respect to said bosses to align said axis established by said apertured bracket ears with said miter gauge grooves; and cap screws having shanks threaded to engage in said tapped bores and freely pass through said bracket through bores to fixedly clamp said support and alignment bracket in adjusted position on said table with its pivot ears disposed between the table under surface and the face of said bracket which abuts said bosses.

8. The subassembly of claim 7 wherein said one edge of said die cast table is formed with spaced apertured mounting bosses the end faces of which establish a plane normal to said miter gauge grooves for use in mounting a rip gauge slide bar.

9. The subassembly of claim 7 wherein the under surface of said table inwardly from said one end is provided with a pair of spaced tapped bosses the axis of which lie in a plane normal to said mite gauge grooves to establish an accurate mount for a clamp bracket having a planar wall designed to extend normal to said miter gauge grooves.

10. A die cast tilt bracket for use with the motor mount subassembly of claim 7 comprising a main web portion having (a) along one edge a pair of upstanding arm members carrying a pair of axially aligned apertured mounting bosses the adjacent end faces of which are spaced apart a distance to snugly receive one of the pivot ears of the main operating mechanism support and alignment bracket therebetween and form therewith and with said other bracket ear pivot bores for a tilt pivot pin, (b) a pair of pivot bore formations formed along an intersecting web edge to establish pivot mounts having an axis lying in a plane normal to the tilt pivot pin axis formed by said upstanding ears of said main operating mechanism support and alignment bracket and said aligned tilt bracket mounting bosses, said pivot mounts being designed to pivotally support a drive motor carrying a saw blade for swing movement toward and away from said table to provide a depth of cut adjustment and (c) a depending wall along the web edge opposite said intersecting web normal to the axis of the pivot mounts, terminating at its lower end in a journal boss having a through bore paralleling said depending wall and provided in upwardly spaced relation to said journal boss with a right angularly related journal boss, said journal bosses being adapted to receive journal blocks for journalling an elevating screw and for threadedly engaging a tilt screw.

11. The die cast tilt bracket of claim 10 wherein said tilt bracket is provided with a depending apertured reinforcing wall disposed at right angles to said first mentioned depending wall formed adjacent its intersection with said main web portion and on the face remote from said first depending wall with an open ended walled enclosure defining a non-circular slide chamber normally disposed with relation to the axis established by said pivot mounts and adapted to receive a main clamp block of a tilt bracket and drive motor anti-pivot clamp mechanism.

12. A tilting arbor saw operating mechanism subassembly comprising a tilt bracket body having a pair of spaced aligned and axially apertured bosses formed at the upper ends of upstanding wall formations and establishing a tilt axis, a second pair of axially aligned apertured bosses formed along an edge of said body to establish a depth of cut pivot axis lying in a plane normal to the tilt axis, an electric motor having a combined rotor and saw blade arbor shaft and end bells for journalling said combined rotor and saw blade arbor shaft with respect to the motor stator, said end bells being die castings having apertured mounting arms integrally formed thereon and terminating in pivot apertures formed in parallel relation to the axis of the end bell journals to establish parallelism of said axes; a pivot pin passing through said second pair of apertured bosses and said end bell pivot apertures to pivotally mount said motor with its shaft parallel to said depth of cut pivot axis; a depth of cut control sleeve mounted on said tilt bracket in spaced relation below the opposite edge of said upstanding wall formation from said apertured tilt axis establishing boss; a depending leg on one of said end bells journalling a depth of cut control nut having a threaded bore; a depth of cut adjustment screw operatively connected to said control nut and extending through the bore thereof; means embodied in said control sleeve and operatively connected to said depth of cut adjustment screw for axially fixing said adjustment screw with respect to said tilt bracket while permitting rotational movement thereof; and means for rotating said adjustment screw to cause said control nut to travel therealong to pivot said tilt bracket about said pivot pin and thereby pivot said motor to vary the depth of cut of said saw blade.

13. The tilting arbor saw operating mechanism subassembly of claim 12 including an angle hinge pin passing through said first mentioned pair of spaced, aligned, and axially apertured bosses to mount said tilt bracket for pivotal movement about said tilt axis, a threaded tilt angle control nut mounted on said tilt bracket below said angle hinge pin and having a threaded bore with its axis in a plane perpendicular to said tilt axis; a tilt angle adjustment screw operatively connected to said control nut and extending through the bore thereof, a control sleeve for preventing axial movement of said tilt angle adjustment screw while permitting rotational movement thereof; and means for rotating said tilt angle adjustment screw to cause said tilt angle control nut to move therealong to pivot said tilt bracket about said angle hinge pin and thereby tilt said motor to vary the angle of cut of said saw blade.

14. A tilt bracket and drive motor anti-pivot clamp mechanism for releasably securing a motor shaft mounted cutting tool in a predetermined tilt angle and depth of cut relationship to a large area work surface comprising an elongated locking pin having an enlarged abutment at one end thereof and a threaded portion extending to the end opposite said abutment; a locking wedge rotatively journalled on said locking pin against said abutment and embodying a guide for slidably engaging one side of a motor pivoting member and means disposed at right angles to said guide for engaging the motor pivoting member and preventing relative rotation of said member and said locking wedge; a locking sleeve journalled on said locking screw embodying a guiding face for slidably engaging the opposite side of said motor pivoting member, said locking screw being adapted to be connected to a tilt bracket; a locking bracket fixedly mounted with respect to the tilt bracket and motor pivoting member and having an arcuate slot extending transversely of and receiving the threaded end portion of the locking pin; and a locking knob threaded on the end of said locking bracket and disposed on the opposite side of said locking bracket from said locking sleeve, said locking wedge and said locking sleeve releasably securing said motor pivoting member between them to prevent movement thereof, and said locking screw and said control knob releasably grasping the opposite sides of said locking bracket to fixedly position said locking pin in said arcuate slot and prevent movement of said tilt bracket.

15. A cast motor end bell member comprising a cup-shaped body portion adapted to fit over the motor stator, a first integral arm portion extending transversely of the side wall of said body portion and adapted to be connected to depth of cut adjusting member for pivoting the end bell member about an axis transverse to the end wall of the cup-shaped body portion; and a second integral arm portion extending transversely of said housing and substantially normal to said first integral arm portion and adapted to be selectively engaged by a tilt bracket and drive motor anti-pivot clamp mechanism to lock said motor against pivotal movement.

16. The motor end bell of claim 15 including a conical baffle formed on the inside of the cup-shaped body portion and having its base integral with the end wall of the body portion.

17. The motor end bell member of claim 15 including an apertured boss formed on said second integral arm with the axis of the aperture substantially parallel to the side wall of the cup-shaped body portion of said bell member, said aperture being adapted to receive a pivot hinge pin for pivotally mounting said end bell member.

References Cited

UNITED STATES PATENTS

| | | | |
|---|---|---|---|
| 2,068,964 | 1/1937 | Tautz | 143—33 |
| 2,261,696 | 11/1941 | Ocenaser | 143—36 |
| 2,265,407 | 12/1941 | Tautz | 143—36 |
| 3,244,031 | 4/1966 | Mitchell | 144—253 X |

WILLIAM W. DYER, Jr., *Primary Examiner.*

W. D. BRAY, *Assistant Examiner.*

UNITED STATES PATENT OFFICE
CERTIFICATE OF CORRECTION

Patent No. 3,356,111                                  December 5, 1967

Walter G. Mitchell

It is hereby certified that error appears in the above numbered patent requiring correction and that the said Letters Patent should read as corrected below.

Column 3, lines 51 and 52, for "descriptition" read -- description --; line 58, for "ball" read -- bell --; line 66, after "left" insert -- side --; column 4, line 46, for "according" read -- accordance --; line 52, for "effecting" read -- effectuating --; column 12, line 16, for "FIGURES" read -- FIGURE --; line 50, for "preferable" read -- preferably --; column 15, line 35, after "806" insert -- of --; column 19, line 6, for "journal" read -- journalled --; line 7, for "aperture" read -- apertures --.

Signed and sealed this 14th day of January 1969.

(SEAL)
Attest:

Edward M. Fletcher, Jr.                                EDWARD J. BRENNER Attesting Officer                                          Commissioner of Patents